United States Patent Office 3,524,086
Patented Aug. 11, 1970

3,524,086
MAGNETOHYDRODYNAMIC APPARATUS
Bryan Charles Lindley, Newcastle-upon-Tyne, England, assignor to C. A. Parson & Company Limited, Newcastle-upon-Tyne, England, a British company
Filed Apr. 26, 1967, Ser. No. 633,976
Claims priority, application Great Britain, Apr. 28, 1966, 18,742/66
Int. Cl. H02n 4/02
U.S. Cl. 310—11          3 Claims

ABSTRACT OF THE DISCLOSURE

Magnetohydrodynamic apparatus which includes means for inducing the flow of an electrically conductive seeded fluid through a duct, means for producing a desired initial level of electrical conductivity in the fluid, and means for externally controlling, continuously or at intervals along the duct, the electrical conductivity of the fluid independently of the bulk fluid temperature so as to maintain the electrical conductivity over the effective working portion of the duct at a predetermined level.

---

This invention relates to magnetohydrodynamic apparatus hereinafter referred to as "MHD apparatus."

In such apparatus, the mutual interaction of a flowing electrically conductive fluid and an applied magnetic field produces an electromotive force in the fluid. In a typical form, the fluid flows in a duct in the direction of the duct axis and the magnetic field is applied in a direction transverse to the duct axis. The electromotive force is induced in a direction mutually perpendicular to the direction of fluid flow and to the direction of the lines of force of the magnetic field.

The apparatus may be used to generate electricity by connecting a load circuit to electrodes in contact with the flowing fluid or, conversely, by applying an electric potential across such electrodes, the apparatus can be caused to act as a pump propelling the fluid through the duct.

Instead of flowing in a linear path, as in the typical form mentioned above, other forms are known wherein the fluid flows, for example, in a helical, radial or circumferential path.

In MHD apparatus used to generate electricity, the electrically conductive fluid is usually a seeded fluid, that is to say it is a fluid, usually a gas, seeded with a readily ionizable material, such as one of the alkali metals cesium, rubidium, potassium or sodium. In this way the level of electrical conductivity necessary to obtain a useful power output can be achieved without having to operate at temperatures which are too high from a practical viewpoint. Nevertheless, the temperature at which such apparatus operates is very high, the inlet temperature being up to 3000° K. or higher and the outlet temperature of the apparatus normally being of the order of 1500–2000° K. This means that, to obtain a thermal efficiency better than for conventional electricity generating plant, it is necessary to utilise the heat content of fluid leaving the MHD apparatus in a conventional heat engine such as a steam or gas turbine.

If the MHD process could be controlled in such a way that it took place over a temperature range which could be chosen primarily on thermodynamic grounds, useful work could be extracted from the apparatus down to temperatures which are much closer to the exhaust temperatures of conventional heat engines, and there would be scope for substantially reducing the size and output required from conventional heat engines working in association with the apparatus. In some instances, it might be possible to eliminate altogether the need for such heat engines to raise the overall efficiency of the plant as a whole.

The process of ionisation of the seed material involves the dissociation of atoms to ions and free electrons and it is known that the greater the free electron temperature, the greater is the ionisation level and hence the greater is the electrical conductivity of the fluid.

The heating of the fluid to achieve the desired level of ionisation is known as "thermal" or "equilibrium" ionisation, but other "extra-thermal" or "nonequilibrium" process of ionisation are known which do not rely on the heating of the fluid to produce ionisation. Examples of such nonequilibrium processes include injection of electrons into the fluid and photo-ionisation, the latter process being described in our British Pat. No. 968,949. Such processes may be used singly or in combination, but, hitherto, whatever the process or combination of processes used, the aim has always been to achieve a degree of ionisation, and hence electrical conductivity, in the fluid at the inlet to the MHD duct which is high enough to ensure that over the effective working length of the duct the ionisation level, and hence the electrical conductivity level, does not fall below that required to obtain a useful output. Having achieved the necessary degree of ionisation and electrical conductivity at the duct inlet, the subsequent change of ionisation level and level of electrical conductivity, is entirely or substantially a function of the MHD process itself. In some cases as, for example, in our British Pat. No. 698,949, it has been proposed that means for nonequilibrium ionisation be applied at positions along the duct, but it is not arranged that such means are operative in achieving control of the process in the manner to be described.

In broad terms the present invention consists in MHD apparatus having a duct through which flows a seeded fluid which is electrically conductive, and means for raising the electrical conductivity to a desired initial level, together with means for externally controlling continuously or at intervals along the duct the electrical conductivity of the fluid independently of the bulk fluid temperature, so as to maintain the electrical conductivity over the effective working portion of the duct at a predetermined level.

The level at which the conductivity is maintained will depend upon the basic conditions under which the duct is to operate. The duct may be required to operate for example, at constant fluid velocity, Mach Number, static pressure or static temperature, or with a prescribed variation of any one or combination of these parameters over the effective working length of the duct. It may be required to operate with a prescribed variation of specific power output or with a prescribed variation of electric field potential along the duct or with a prescribed current density at the electrodes to allow for any practical limit in the current carrying capacity of the electrodes. Alternatively, or in addition, it may be required to achieve a prescribed overall adiabatic or isentropic efficiency. The electrical conductivity is, therefore, controlled externally to maintain it at a level which will be predetermined to enable the duct to meet any of the above-mentioned basic conditions either singly or in combination and, in a preferred form, the electrical conductivity is maintained at a substantially constant level over the effective working portion of the duct.

In the preferred form, the electrical conductivity is raised to a desired initial level before entering into or in the inlet region of the duct and subsequently controlled by external means at chosen intervals along the duct. By this means the variation of electrical conductivity along the duct is no longer solely dependent on the MHD process itself.

The external control of electrical conductivity to reach the desired initial level and to maintain it at a predetermined level along the duct can be achieved by the known processes for enhancing ionisation, the basic process being a thermal ionisation process supplemented, where necessary, by nonequilibrium ionisation processes. Such nonequilibrium processes may involve the application to the fluid of direct or alternating electric fields, or electromagnetic radiation including X-rays and gamma-rays, or radiation in the visible or near-visible range of wavelength, or the injection of electrons or ions into the fluid, or the bombardment of the fluid by uncharged particles such as neutrons, alpha-particles or nuclear fission products.

In one embodiment of the invention, the control of the electrical conductivity of the fluid is achieved by providing means to control the temperature of the free electrons in the fluid independently of the bulk fluid temperature so as to maintain the temperature of the free electrons at a predetermined level in excess of the bulk fluid temperature over the effective working length of the duct. In a preferred form the electron temperature is maintained at a substantially constant level.

In one form, the means for controlling the temperature of the free electrons are adapted to vary the loading factor along the duct, the loading factor being defined as the ratio of the effective external load resistance at any place in the duct, to the effective total circuit resistance at that place.

In an alternative embodiment of the invention, the means for controlling the free electron temperature are adapted to vary the concentration of seed material in the fluid at different parts of the duct. The concentration of the seed material can be varied by either varying the quantity of seed material present at different parts of the duct or conversely by varying the quantity of fluid at different parts of the duct.

In a further embodiment of the invention the means for controlling the free electron temperature are adapted to vary the composition of the fluid at different parts of the duct.

In another embodiment of the invention the means for controlling the free electron temperature are adapted to vary the velocity of the fluid as it flows through the duct.

In a further embodiment of the invention the means for controlling the free electron temperature are adapted to vary the magnetic field applied to the duct at different parts of the duct.

In a preferred embodiment of the invention, the fluid used is a monatomic gas or mixture of monatomic gases and this gas or the mixture of gases may contain constituents not in the gas phase for example liquid droplets or solid particles.

The invention will become more readily apparent from the following description of various embodiments of the invention shown by way of example in the accompanying drawings in which.

Figure 1:
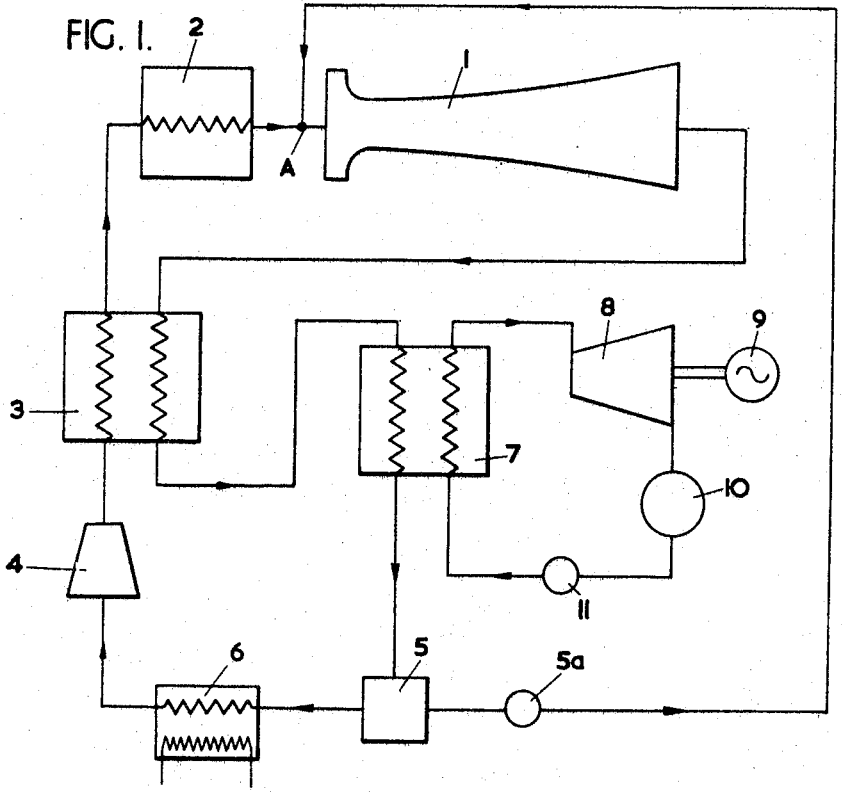
FIG. 1 shows diagrammatically a known form of MHD apparatus for use as a generator of electricity.

Referring first of all to FIG. 1, a typical MHD apparatus of known form, for the generation of electricity, comprises a generator duct 1, a high temperature heat source 2, for example a nuclear reactor, for heating a gaseous cooling fluid prior to its entry into the generator duct, a heat exchanger 3, a compressor 4, a seed separator 5, cooler 6 and a conventional heat engine plant, receiving heat in heat exchanger 7 from the working fluid leaving the generator duct. The conventional heat engine plant includes a steam turbine 8 driving an electrical generator 9 and exhausting to a condenser 10. A pump 11 returns the condensed steam to the heat exchanger 7. Whilst a steam turbine has been shown, other forms of heat engine for example, a gas turbine, can also be used. In addition, the main circuit containing the MHD apparatus may incorporate various arrangements of heat exchangers, compressors, means such as gas turbines for driving the compressors, and other circuit components for reasons of efficiency or cost.

The working fluid leaving the heat source 2 has seed material, for example cesium, added at A and the seeded fluid is then expanded through the MHD generator duct 1, the inlet of which is in the form of a nozzle to accelerate the flow into the duct. In passing through the duct, the fluid interacts with a magnetic field applied across the duct and an electromotive force is generated in a plane at right angles to the direction of the magnetic field. Electric power is taken to an external load circuit through electrodes (not shown). The working fluid leaving the duct 1 passes first through heat exchanger 3 where it gives up part of its heat to the working fluid on its way to heat source 2. On leaving the heat exchanger 3 the fluid enters heat exchanger 7 where it heats water to raise steam for turbine 8. The fluid then passes to seed separator 5 where seed material is removed and returned via pump 5a, to the seed injection point A at the entry to the duct 1.

Fluid leaving the separator 5 is cooled in cooler 6, is compressed in compressor 4 and then returned to the duct 1 via heat exchanger 3 and heat source 2. The working fluid thus flows in a closed cycle.

The plant illustrated is typical of many known forms of MHD apparatus and whilst a closed cycle has been described, open-cycle plants are also known in which the working fluid is a gas mixture formed by the products of combustion of a fuel in air, or in air enriched with oxygen, or in oxygen alone. In the closed cycle the working fluid is usually a gas such as helium, neon or argon.

The electrical power output of MHD apparatus depends primarily on $\sigma \mu^2 B^2$ where $\sigma$ is the electrical conductivity of the fluid, $\mu$ is the velocity of flow and B is the magnitude of the applied magnetic field. The use of seeding material enables an acceptably high level of electrical conductivity to be realized in the fluid consistent with the production of a useful power output at temperatures which are not too high to be impractical. Nevertheless, the maximum and minimum temperatures in the duct may be much higher than that required on purely thermodynamic grounds to obtain an acceptable thermal efficiency. The temperatures of the fluid falls as electrical power is extracted and eventually the power per unit volume which can be extracted becomes so low that the process must be terminated at a higher temperature than would be selected on thermodynamic grounds; hence the need for conventional plant to make use of the substantial residual heat content in the fluid leaving the generator duct.

The present invention proposes to control, by external means, the electrical conductivity of the fluid independently of the bulk temperature thereof, either continuously or at intervals along the duct. Control of electron temperature is one way of achieving this.

Generally speaking the greater the electron temperature the greater is the electrical conductivity of the fluid because of increased ionisation of the seed material. To obtain an electrical conductivity in the fluid high enough for the MHD process to work satisfactorily it is required that a sufficient concentration of free electrons be present in the gas. Another factor is the resistance to flow through the fluid of those electrons under the influence of the induced electric field. If the resistance is high the electrons suffer elastic and other collisions with the ions, neutral atoms, molecules and other species which constitute the body of the fluid. It is therefore important to keep the resistance to flow of electrons in the fluid to a minimum and consequently, for the purpose of the present invention, the use of a seeded monatomic gas such as helium, neon or argon is preferred. In general the resistance to flow of free electrons through such monatomic gases is very much less than that through the vaporized seed material. The resistance to flow of electrons through such monatomic gases is also much less than that through the products of combustion of a fuel.

By using a fluid which offers a low resistance to the flow of free electrons, energy may be fed preferentially to the electrons and, provided the energy given to the electrons exceeds that dissipated in elastic and other collisions, the electron population can acquire an average thermal energy and hence temperature which is substantially higher than that of the body of the fluid. Preferably, operating conditions should be selected such that the electrons are accelerated in the induced field of the generator itself so that energy is derived from the passage of the external load current through the fluid.

The temperature of the free electrons is a predominant factor in controlling the ionisation level and consequently if the temperature of the free electrons can be enhanced without having to supply the thermal energy required to raise all ions, neutral atoms, molecules and other component species of the fluid to the same temperature level, an increase in electrical output power can be achieved which is very much greater than the power dissipated internally in the MHD apparatus. The effect of enhancing the electron temperature is to increase the proportion of seed material which is dissociated from atoms to ions and free electrons.

The ratio of electron temperature $T_e$ to fluid temperature can be expressed as $$\frac{T_e}{T} = 1 + \frac{\gamma(1-k)^2 M^2 \beta e^2}{3\delta(1+\beta_e\beta_i)^2} \quad (1)$$

where $\gamma$ is the ratio of specific heats for the working fluid, $k$ is the loading factor of the generator (defined as the ratio of external load resistance to total circuit resistance), $M$ is the Mach number of flow, $\beta_e$ is the Hall number for electrons, $\beta_i$ is the Hall number for ions, and $\delta$ is a factor which represents the effect of energy losses such as inelastic collisions in the gas. The Hall number is given by $\omega_e\tau_e$ for electrons and $\omega_i\tau_i$ for ions, where $\omega_e$ and $\omega_i$, both of which are proportional to the applied magnetic field B, are the angular frequencies of gyration in a magnetic field of electrons and ions respectively, and $\tau_e$ and $\tau_i$ are the respective time intervals between collisions for the electrons and ions.

Figure 2:
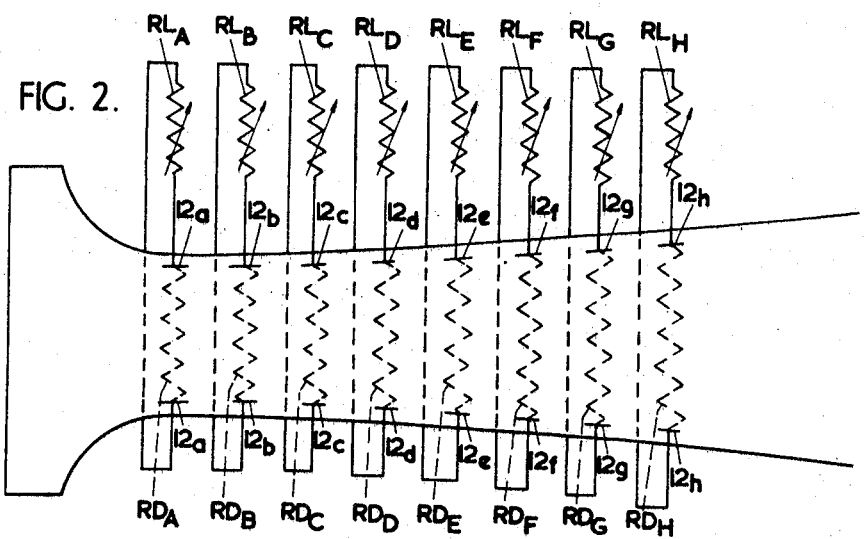
FIG. 2 shows diagrammatically an MHD duct construction incorporating means for controlling the electrical conductivity by controlling the electron temperature in accordance with one embodiment of the present invention.

One way of controlling the electron temperature is by varying the load factor $k$, and FIG. 2 shows a generator duct incorporating means for achieving this. In the duct shown, segmented electrodes 12 are used, that is to say the electrodes are not continuous in the direction of the duct axis, but are divided up into a number of separate electrodes along the duct axis. In a practical generator there would be a large number of pairs of electrodes. Each pair of opposed electrodes is connected through a load circuit as represented by the resistance RL, the load circuit connected to electrodes 12 being designated $RL_A$, that connected to the electrode 12b being designated $RL_B$ and so on. The internal resistance across the duct between a pair of electrodes is represented as RD and the loading factor $k$ for a pair of electrodes is, therefore given by $$\frac{RL}{RL+RD}$$

assuming that the resistance of the remainder of the circuit is small compared with RL and RD.

It is important to achieve a high electron temperature as quickly as possible and it may be desirable in some instances to vary the load resistance in the circuit of the initial pair or pairs of electrodes, near the inlet to the duct, so that the loading factor in these electrodes is zero, corresponding to a short circuit condition, or even negative in which case an impressed voltage would be applied to the electrodes. Thus electrodes 12a and possibly electrodes 12b could be operated in this manner. The number of pairs of electrodes chosen to operate in this manner would depend on circumstances. Thereafter, the loading factor on the remaining pairs of electrodes could be varied so as to maintain the electron temperature at a predetermined level. In many cases the electron temperature will be maintained substantially constant over the effective working length of the duct, that is to say between the first and last pair of electrodes in the direction of fluid flow, but it may be desirable to depart from a constant electron temperature in certain circumstances depending on requirements. The criteria governing the choice of electron temperature and the manner in which it is caused to vary are set out later in the specification.

Figure 3:
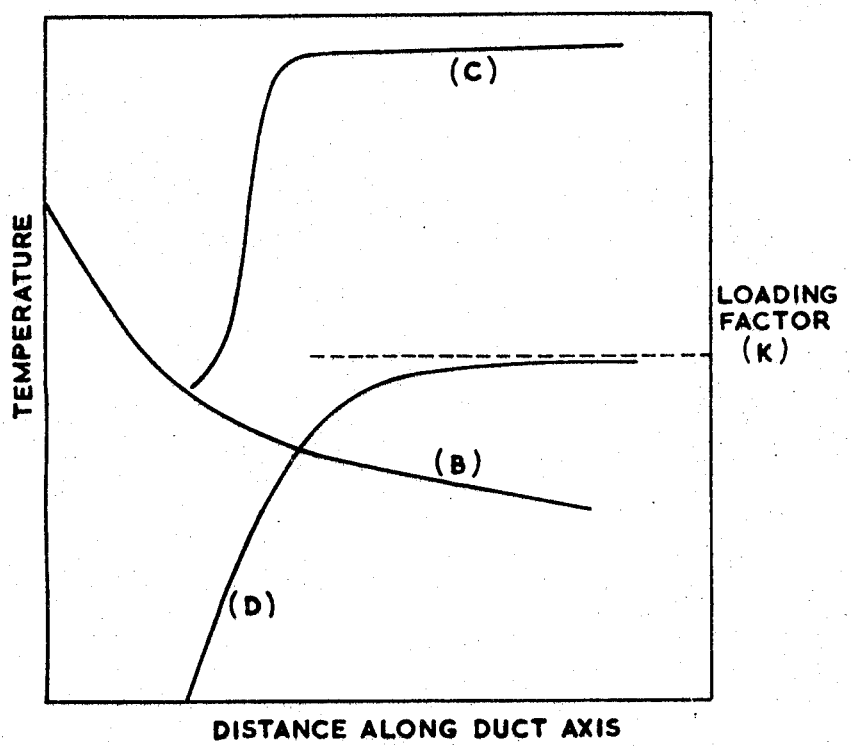
FIG. 3 shows graphs plotting the variation of fluid temperature, electron temperature and loading factor against distance along the duct axis.

FIG. 3 shows typical curves for the variation of fluid temperature, Curve B, electron temperature, Curve C, and loading factor, Curve D, along the duct axis. It will be seen that, typically, the loading factor increases rapidly and then levels off at a value near unity. Under certain conditions of operation such a variation in loading factor also inhibits an inherent "runaway" effect in which electron temperature rises rapidly in an uncontrolled manner. For example with constant fluid velocity and a fixed loading factor, the enhancement of electrical conductivity allows a higher specific power extraction which requires a higher current to flow. This in turn produces additional electron heating. Further reduction in pressure level due to power extraction enhances still further the electron heating. This "runaway" effect is counteracted by increasing the loading factor for example in the manner illustrated in FIG. 3.

Whilst initial reduction of the loading factor is desirable for the reasons stated, the overall adiabatic efficiency of the generator is related to the loading factor, and for optimum efficiency the loading factor should be increased to a high value as quickly as possible having regard to the factors outlined above regarding electron temperature.

In the form illustrated in FIG. 2, each pair of opposed electrodes is connected to a separate load circuit. The invention can, however, be applied to MHD apparatus where the load circuits are connected across pairs of electrodes which are not directly opposite one another in the duct. As is well known, an effect known as the "Hall effect" occurs in such apparatus whereby the interaction of the applied magnetic field and the flowing electric current, has the effect of modifying the electromotive force or electric field so that it may be considered to have components parallel to and perpendicular to the direction of fluid flow. The use of segmented electrodes as described, avoids short circuiting of the axial component of the electrical field but, as a result of the "Hall effect," it is possible that an electrode on the wall of the duct is at the same potential as another electrode on the other wall and at some distance further along the duct in the direction of fluid flow. As a result, it is in some cases the practice to connect electrodes which are displaced from one another in the direction of fluid flow.

Figure 4:
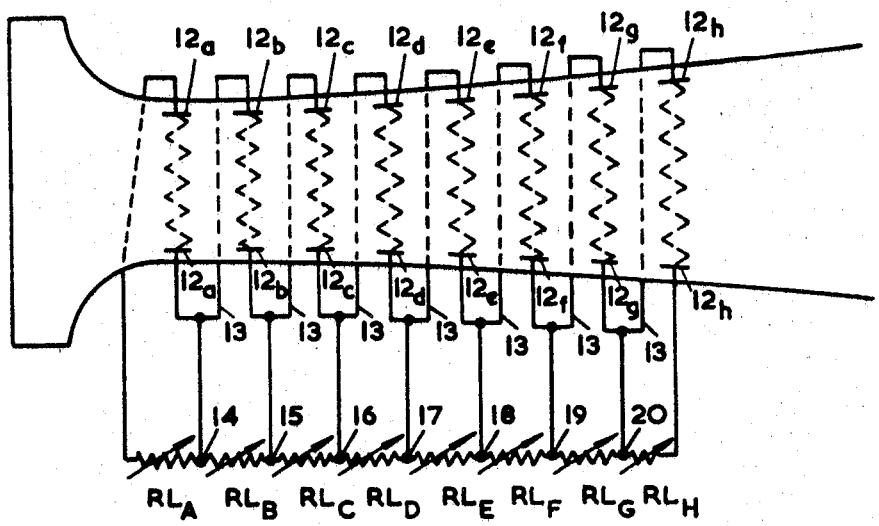
FIG. 4 shows diagrammatically an MHD duct in accordance with a further embodiment of the present invention.

FIG. 4 shows a duct having electrodes connected in this way. External conductors 13 connect the pairs of electrodes 12a, 12b, 12c, etc. in series and there is a single external load circuit RL. In some cases the "Hall effect" may be such as to require the connection of electrodes which are not immediately adjacent in the direction of the duct axis. Thus electrodes 12a might be connected to electrodes 12c, or 12d or electrodes even further downstream. In this way a number of groups of series connected electrodes is obtained each with its own load circuit, but the number of load circuits would still be less than for the arrangement shown in FIG. 2.

To vary the loading factor with an arrangement such as that shown in FIG. 4, the load circuit can be provided with tapping points 14–20 to which conductors 13, between successive electrode pairs 12a, 12b, etc., are connected. Thus conductor 13, between electrode pairs 12a and 12b, is connected to tapping point 14, conductor 13 between electrode pairs 12b and 12c, is connected to tapping point 15 and so on. Each of the load circuit resistances $RL_A$, $RL_B$, $RL_C$, etc., between tapping points is a variable resistance so as to enable the loading factor to be varied along the duct.

Figure 5:
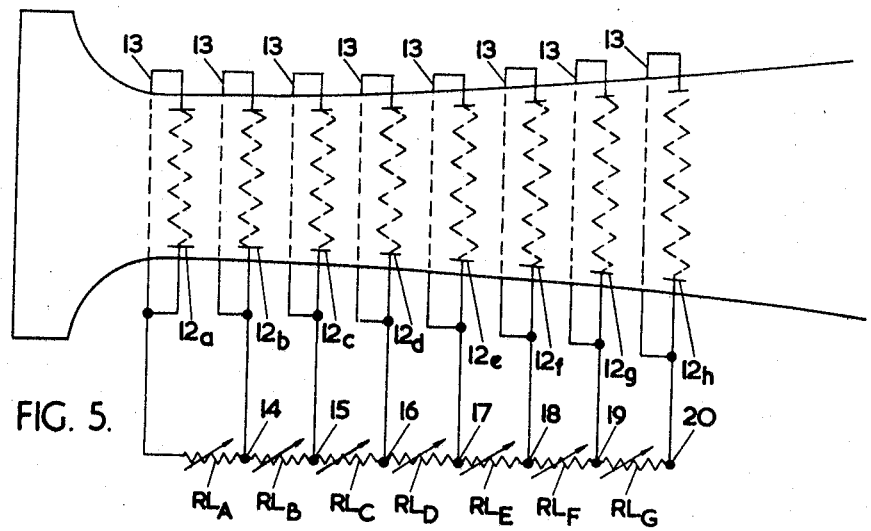
FIG. 5 shows diagrammatically an MHD duct similar to that shown in FIG. 4 but showing different electrode connections.

The invention is also applicable to a further form of apparatus as shown in FIG. 5 in which, to take account of the "Hall effect," each opposed pair of electrodes is connected externally through a conductor 13 so that a short circuit current flows between the electrodes and through the conductor 13 in each case. The electrodes 12a and 12b are connected to a load circuit resistance RL and the loading factor $k$ along the duct may be varied in similar manner to that described in FIG. 4, by connecting successive pairs of electrodes to the tapping points 14–20 in the load resistance RL. Thus electrodes 12b are connected to tapping point 14, electrodes 12c to tapping point 15 and so on. In such an arrangement the load current flows axially along the length of the duct.

The number of pairs of electrodes used in the arrangement of FIGS. 4 and 5 will be chosen to suit circumstances and in practice, as mentioned earlier, many more pairs than those shown will be necessary.

Figure 6:
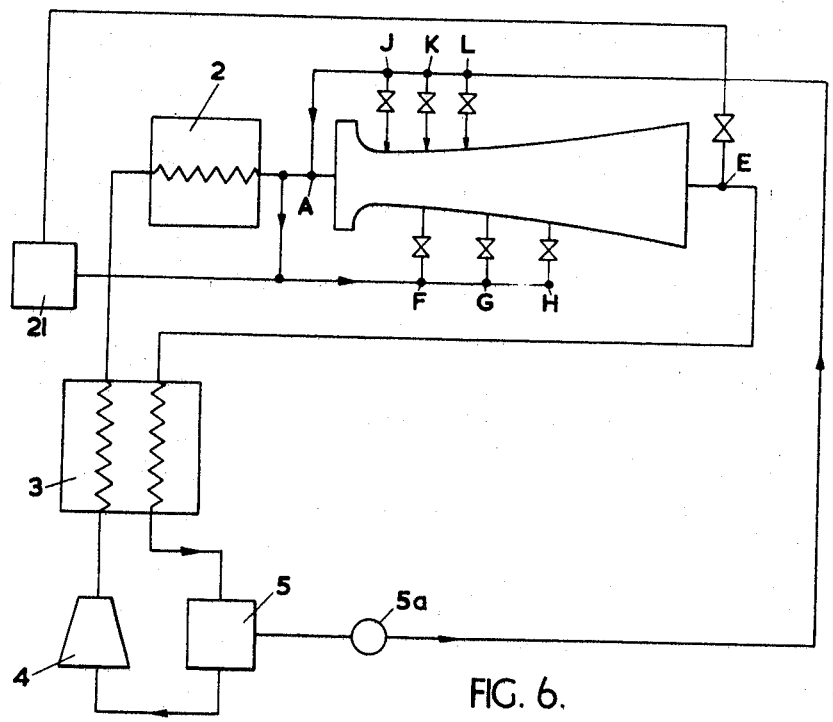
FIG. 6 shows diagrammatically MHD apparatus in accordance with another embodiment of the invention.

As mentioned earlier, the electron temperature depends on the resistance to flow of electrons in the fluid and to this end the use of a monatomic gas or gases such as helium, neon and argon has been mentioned. The presence of seeding material also influences the resistance to flow whether in the form of atoms, ions or in some compound form, the effect being to vary the values of $\beta_e$, $\beta_i$ and $\delta$ in Equation 1. In accordance with another embodiment of the invention, therefore, it is proposed to vary the concentration of seeding material present in the fluid along the duct. This can be achieved by injecting or removing seed material at various points along the duct or by injecting or removing fluid at various parts along the duct or by a combination of both these methods. FIG. 6 shows MHD apparatus with provision for the injection of seed material or fluid at a plurality of points along the duct. The fluid injected may be the same as the fluid entering the duct from the heat source or fluids of differing composition may be injected from vessel 21 to give further control over the electron temperature. Fluids added in this manner are removed from the cycle at E returned to vessel 21 and reintroduced at points F, G and H as shown. The seed material returning to point A from separator 5 can be tapped off at points J, K and L and fed into the duct.

Equation 1 also shows that the electron temperature depends on the Mach number and to achieve a rapid initial rise in electron temperatures, the inlet Mach number to the duct can be made as high as practicable and then subsequently reduced along the duct. In view of the fact that the electron temperature and hence the electrical conductivity of the fluid are no longer dependent on the local static temperature within the fluid, it is permissible to consider the use of high supersonic flow Mach numbers, the limit imposed being governed by friction and pressure losses within the duct as these reduce overall cycle efficiency. Subsonic Mach numbers at the duct inlet are obtained by using a convergent nozzle, while supersonic flow is obtained by employing a convergent-divergent nozzle of suitable profile. The Mach number in the generator duct can be varied by adjusting the flow area in a suitable manner. For example to decelerate subsonic flow, the rate of increase of flow area along the duct would be larger than for a constant Mach number duct. Again to decelerate supersonic flow the rate of decrease of flow area is larger than for constant Mach number operation.

The abovementioned methods of effecting control over the electron temperature independently of the fluid temperature can be used singly or in any desired combination to achieve the desired result. Typically the aim will be to maintain a substantially constant electron temperature over the duct after an initial sharp rise of temperature, but other temperature levels and variations may be used to suit circumstances.

The control of the electron temperature in the manner described above presupposes a basic initial level of ionisation in the fluid entering the duct and this can be achieved by conventional ionisation processes and would comprise, basically, a thermal ionisation process supplemented where necessary by nonequilibrium processes. Known nonequilibrium processes can also be used to control the electrical conductivity of the fluid along the duct either in addition to the means for controlling the electron temperature described above or in place thereof. Such known processes include the application of direct or alternating electrical fields, the application of electromagnetic radiation of a wide range of frequencies including X-rays and gamma-rays, but especially in the visible and near visible frequencies, such as the ultraviolet region, the injection of electrons or ions or the bombardment of the fluid by uncharged particles such as neutrons, alpha particles or nuclear fission products. The injection into the fluid of solid particles of materials such as tungsten and graphite to produce thermionic emission, can also be used. In some instances the injection of liquid metal droplets into the fluid can be used to increase the interaction with the magnetic field.

The choice of the method used and the electrical conductivity level along the duct will be governed by the need to meet one or more of the following criteria.

(a) Operation of the duct at substantially constant fluid velocity, Mach number, static pressure or static temperature or with a prescribed variation of any one or combination of these parameters along the length of the duct.

(b) Operation of the duct with a prescribed variation of specific power output (that is power output per unit volume of duct) along the length of the duct.

(c) Operation of the duct with a prescribed variation of the electric field potential along the length of the duct.

(d) Operation of the duct with a prescribed current density at the electrodes to allow for any practical limit in the current carrying capacity of the electrodes.

(e) Operation of the duct to achieve a prescribed overall adiabatic or isentropic efficiency.

Whilst the desirability of keeping the resistance to flow of electrons in the fluid make the use of a monatomic gas or gases desirable, other gases can be used if the resistance to electron flow which they produce is acceptable. The invention can therefore be applied to MHD apparatus working on the open cycle. It can also be applied to a fluid composed entirely of seed material in vapour form and the terms "seed material" and "seeded fluid" are intended to include such fluids.

In addition, whilst the application of the invention to MHD apparatus for the generation of electricity has been described it can also be applied to MHD apparatus used for pumping purposes. In the case of an MHD pump, however, it is not the induced electric field which gives rise to electron heating but the electric field applied to each pair of electrodes or through a suitable series or Hall interconnection as described for MHD generators. Consequently, the electron heating effect once established will tend to be highest at the duct entry where the fluid may be moving with a relatively low velocity and be reduced as the flow accelerates along the duct. Once the fluid moves with a higher velocity there is an induced electromotive force which opposes the applied voltage and tends to reduce the electron heating. To obtain the prescribed variation of electron temperature along the length of the duct it is necessary to vary the impressed voltage to obtain an effect equivalent to varying the load factor $k$. The opposing electromotive force may be modified by arranging for a prescribed variation of the fluid-velocity along the duct and, as described in the case of an MHD generator, the proportions and constituents of the working fluid may be modified locally to control the electron temperature.

The application of the invention is not limited to fluid flow in ducts of the form shown but can be applied to other forms wherein the fluid may flow, for example, in a helical, radial or circumferential path.

By controlling the electron temperature independently of the fluid temperature in the manner described it becomes possible to operate the MHD apparatus at temperatures which are chosen from a thermodynamic point of view, with the result that it becomes possible to operate, if desired, at lower temperature levels as far as the gas is concerned. Moreover the need for conventional plant to achieve an acceptable thermal efficiency is substantially reduced and in some cases may be eliminated altogether.

I claim:

1. Magnetohydrodynamic apparatus which includes means having walls defining a duct having an effective working portion and means for inducing the flow of an electrically conductive seeded fluid through said duct, the improvement comprising means for producing a desired initial level of electrical conductivity in the fluid in said duct, a plurality of pairs of electrodes in opposite walls of said duct, each opposed pair of electrodes being separated from adjacent pairs in the direction of fluid flow through said duct, external electrical connections connecting each pair of opposed electrodes electrically in series with an adjacent pair, a load circuit, means connecting the series connected pairs of electrodes to said load circuit, and means for externally controlling along the duct the electrical conductivity of the fluid independently of the bulk fluid temperature so as to maintain the electrical conductivity over the effective working portion of the duct at a predetermined level, said means for externally controlling the electrical conductivity of the fluid comprising tapping points in said external connections between pairs of electrodes and tapping points in said load circuit, electrical connections, linking each tapping point in an external connection with a corresponding tapping point in the load circuit, and means for varying the load circuit resistance between tapping points whereby the loading factor, as herein defined, may be varied along the duct.

2. Magnetohydrodynamic apparatus which includes means having walls defining a duct having an effective working portion and means for inducing the flow of an electrically conductive seeded fluid through said duct, the improvement comprising means for producing a desired initial level of electrical conductivity in the fluid in said duct, a plurality of pairs of electrodes in opposite walls of said duct, each opposed pair of electrodes being separated from adjacent pairs in the direction of fluid flow through said duct, an external electrical connection short circuiting each opposed pair of electrodes, a load circuit connected between a pair of opposed electrodes in the region of the inlet of the duct and a pair of opposed electrodes in the region of the outlet of the duct, and means for externally controlling along the duct the electrical conductivity of the fluid independently of the bulk fluid temperature so as to maintain the electrical conductivity over the effective working portion of the duct at a predetermined level, said means for externally controlling the electrical conductivity of the fluid comprising tapping points provided in said load circuit and in the said short circuiting external electrical connections, electrical connections being made between tapping points in the load circuit and tapping points in the said short circuiting external electrical connections, and means for varying the load circuit resistance between tapping points whereby the loading factor, as herein defined, may be varied along the duct.

3. Magnetohydrodynamic apparatus which includes means having walls defining a duct having an effective working portion and means for inducing the flow of an electrically conductive seeded fluid through said duct, the improvement comprising means for producing a desired initial level of electrical conductivity in the fluid in said duct including means for adding seed material to said fluid, and means for externally controlling along the duct the electrical conductivity of the fluid independently of the bulk fluid temperature so as to maintain the electrical conductivity over the effective working portion of the duct at a predetermined level comprising means for varying the concentration of seed material in the fluid at different parts of the duct.

References Cited

UNITED STATES PATENTS

| | | | |
|---|---|---|---|
| 3,260,867 | 7/1966 | Hurwitz | 310—11 |
| 3,354,328 | 11/1967 | Maitland | 310—11 |
| 3,355,605 | 11/1967 | Okress | 310—11 |

DAVID X. SLINEY, Primary Examiner